US009680319B2

United States Patent
Tischer (10) Patent No.: US 9,680,319 B2
(45) Date of Patent: Jun. 13, 2017

(54) ELECTRICAL SYSTEM FOR UNIVERSAL CHARGING STATION

(71) Applicant: Ergotron, Inc., St. Paul, MN (US)

(72) Inventor: William Dale Tischer, Shoreview, MN (US)

(73) Assignee: Ergotron, Inc., St. Paul, MN (US)

( * ) Notice: Subject to any disclaimer, the term of this patent is extended or adjusted under 35 U.S.C. 154(b) by 182 days.

(21) Appl. No.: 14/695,846

(22) Filed: Apr. 24, 2015

(65) Prior Publication Data

US 2015/0380964 A1    Dec. 31, 2015

Related U.S. Application Data

(60) Provisional application No. 62/017,900, filed on Jun. 27, 2014.

(51) Int. Cl.
*H02J 7/00* (2006.01)
*H02J 7/04* (2006.01)

(52) U.S. Cl.
CPC ............ *H02J 7/0044* (2013.01); *H02J 7/007* (2013.01); *H02J 7/0027* (2013.01); *H02J 7/0055* (2013.01); *H02J 7/04* (2013.01); *H02J 7/0042* (2013.01)

(58) Field of Classification Search
CPC ....... H02J 7/0044; H02J 7/0055; H02J 7/0027
USPC ........................................................ 320/114
See application file for complete search history.

(56) References Cited

U.S. PATENT DOCUMENTS

| | | | |
|---|---|---|---|
| 4,742,290 A | 5/1988 | Sutphin et al. | |
| 7,800,914 B2* | 9/2010 | Dully | G06F 1/1632 361/756 |
| 8,125,194 B2* | 2/2012 | Nethken | G06F 1/26 320/115 |
| 8,305,737 B2* | 11/2012 | Ewing et al. | G06F 1/266 174/59 |
| 8,462,528 B2 | 6/2013 | Kajouke et al. | |
| 8,935,011 B2 | 1/2015 | Tischer et al. | |
| 2011/0031927 A1 | 2/2011 | Kajouke et al. | |

FOREIGN PATENT DOCUMENTS

DE    102011077099 A1    1/2012

OTHER PUBLICATIONS

International Application Serial No. PCT/US2015/027569, International Search Report mailed Jul. 2, 2015, 3 pgs.
International Application Serial No. PCT/US2015/027569, Written Opinion mailed Jul. 2, 2015, 5 pgs.

* cited by examiner

*Primary Examiner* — Sun Lin
(74) *Attorney, Agent, or Firm* — Schwegman Lundberg & Woessner, P.A.

(57) ABSTRACT

In an embodiment of the current invention, a battery charging system for charging a plurality of portable electronic devices includes a scaling module configured to receive a first voltage and scale the first voltage to a second voltage, a memory configured to store a value, and a processor configured to receive a signal representing the second voltage, retrieve the value stored in the memory, and adjust at least one charging parameter using a comparison between the retrieved value and the received signal representing the second voltage.

20 Claims, 5 Drawing Sheets

FIG. 5

ELECTRICAL SYSTEM FOR UNIVERSAL CHARGING STATION

CLAIM OF PRIORITY

This patent application claims the benefit of priority of U.S. Provisional Patent Application Ser. No. 62/017,900 to William D. Tischer, titled "ELECTRICAL SYSTEM FOR UNIVERSAL CHARGING STATION" filed on Jun. 27, 2014, which is hereby incorporated by reference herein in its entirety.

TECHNICAL FIELD

This disclosure pertains generally, but not by way of limitation, to systems and methods for charging electronic devices.

BACKGROUND

Charging stations, e.g., charging carts, are being used more and more every day in schools and businesses for charging electronic devices, such as tablet computers, notebook computers, netbook computers, etc. The charging stations can include shelves, wheels, cooling, power, and input/output devices such as Ethernet switches and wireless access points. The station can include shelves for charging, storing, and managing one or more electronic devices.

Each electronic device includes an alternating current (AC) to direct current (DC) converter to convert an AC line voltage to a DC voltage that the electronic device can use. The power to these AC-DC converters can be provided by power receptacles such that the AC-DC converters plug directly into power receptacles or into the receptacles with a cord then to an inline power supply that converts a country-specific AC voltage to a lower DC voltage.

Line voltages and frequencies can vary from country to country (for example 120-volt (V), 60 hertz (Hz) in the United States and 230V, 50 Hz in Germany). In addition, electrical safety codes can vary between countries. Because these differences exist, charging station manufacturers often develop hardware and firmware for control and monitoring that are specific to a geographic region. This can result in two or more controller circuit boards and two or more variations of firmware in order to meet the national safety standards for a particular geographic region.

OVERVIEW

The present inventor has recognized that a problem to be solved can include how to adjust control firmware and sensing used by a charging station so that no matter what region of the world the charging station is used, the electronics of the charging station can function correctly and meet the safety requirements. The present subject matter can help provide a solution to this problem, such as by including a voltage transformer that can be used to adjust one or more parameters of the control firmware so that no matter what region of the world the charging station will be used, the electronics can function correctly and meet the safety requirements.

In an example, this disclosure is directed to a battery charging system for charging a plurality of portable electronic devices. The charging system can include a scaling module configured to receive a first voltage and scale the first voltage to a second voltage, a memory configured to store a value, and a processor configured to: receive a signal representing information about the second voltage, retrieve the stored value from the memory, and adjust at least one charging parameter when indicated based on a comparison between the retrieved value and the received signal representing the second voltage.

In another example, this disclosure is directed to a method of charging a plurality of portable electronic devices. The method can include receiving a first voltage and scaling the first voltage to a second voltage, receiving a signal representing information about the second voltage, retrieving the stored value from the memory, comparing the retrieved value and the received signal representing the second voltage, and adjusting at least one charging parameter when indicated based on the comparison.

In another example, this disclosure is directed to a battery charging station for charging a plurality of portable electronic devices. The station can include a charging system that includes a scaling module configured to receive a first voltage and scale the first voltage to a second voltage, a memory configured to store a value, and a processor configured to: receive a signal representing information about the second voltage, retrieve the stored value from the memory, and adjust at least one charging parameter when indicated based on a comparison between the retrieved value and the received signal representing the second voltage.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As indicated above, line voltages and frequencies can vary from country to country, e.g., 120V, 60 Hz in the United States and 230V, 50 Hz in Germany. As a result, the actual input current used by electronic devices can vary considerably even though the power remains constant from country to country. Because charging stations, e.g., charging carts, charging cabinets (desktop units, wall-mounted units, lockers, or any other type of frame, including benches), and the like, oftentimes limit the input current to national levels, a charging station controller can ensure that no more current than the national level is being used.

Current control can be accomplished using electronic control, switches, and sensors, for example. One challenge, however, is sourcing low-cost high-current components that are approved for safety by all countries globally. Because of this challenge, manufacturers often use components that are nationally approved for safety for a particular region or country. For example, the Nationally Recognized Testing Laboratories (NRTL) of the United States has approved components for the United States but not for Germany due to national differences in electrical codes. Because these national differences in electrical codes exist, developers of charging station hardware and firmware often create the control and monitoring firmware specific to a region. This can result in two or more controller circuit boards and two or more variations of firmware in order to meet the national safety standards for a particular region. However, it is desirable to have one controller board and firmware for all regions.

By using inexpensive components, e.g., mechanical relays, that have regional safety approval by approved laboratories as well as global certificates issued by the International Electrotechnical Commission (IEC), for example, it is possible to provide hardware that is in compliance with all electrical codes. However, a problem remains of how to adjust the firmware and sensing so that no matter what region of the world the charging station will be used, the electronics will function correctly and meet the safety requirements.

The present inventor has recognized, among other things, that a voltage transformer can be used to adjust one or more charging parameters, e.g., of the control firmware, so that no matter what region of the world the charging station will be used, the electronics can function correctly and meet the safety requirements. More specifically, as described in detail below, a primary winding of a voltage transformer can be coupled to the country-specific mains line voltage, which can be connected to an input of the charging station. A ratio of the primary windings to the secondary windings of the voltage transformer can be used to provide a signal to a processor of the charging station that is proportional to the primary voltage. This signal can be different if the cart is attached to a 120-volt line voltage versus a 230-volt line voltage.

FIGS. 1A-1D are views of an example of a charging station, e.g., a laptop charging/storage cart 100, that can implement various techniques of this disclosure. The charging station can include any structure useful for holding a plurality of portable electronic devices, e.g., laptop computers, tablet computing devices, netbooks, or other mobile computing devices, and providing power and/or network connectivity to those electronic devices. Multiple examples of charging stations that can be useful for storing and/or charging portable electronic devices are disclosed in co-owned U.S. Pat. No. 8,935,011 to Tischer and co-pending U.S. patent application Ser. No. 13/025,782, the entire content of each being incorporated herein by reference. Example charging stations can include, for example, charging carts and charging cabinets including, but not limited to, desktop units, wall-mounted units, lockers, and any other type of frame, including benches, and the like, as well as desks, e.g., work place desks or school desks, and other furniture for airport or home charging of multiple devices.

Returning to FIGS. 1A-1D, as shown, the charging station 100, e.g., cart, can include a cabinet 130 defining an interior space for storing a plurality of portable electronic devices. The interior space can in some cases include a docking station 150 for each electronic device disposed in the cart. As shown in FIGS. 1A-1D, in some embodiments the cabinets 130 include a door assembly 170 having one or more doors to close the interior space bounded by a top, bottom, and four sides. Such doors can be of any style including, sliding, openable from the top, or swingable outwardly. In some embodiments, the door may optionally be locked to secure the mobile computing devices within the cart. In some embodiments, wheels 110 can be positioned on an underside of the cabinet 130 to facilitate easy movement of the carts. Further, handles 120 can be provided to facilitate the movement of the cart.

Figure 1A:
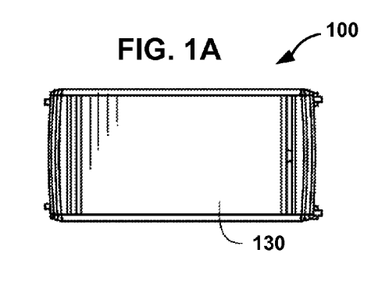
FIGS. 1A-1D are views of an example of a charging station that can implement various techniques of this disclosure.
Figure 1B:
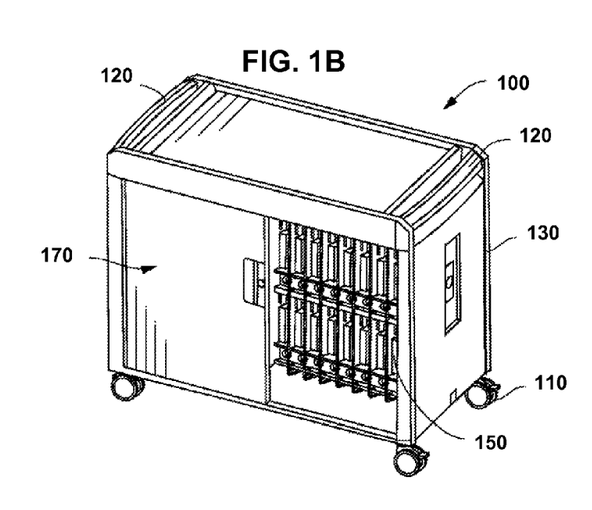
Figure 1C:
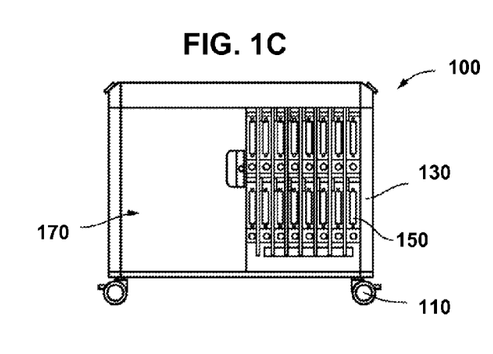
Figure 1D:
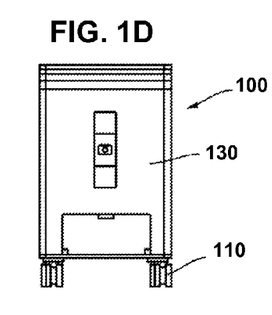

As shown in FIGS. 1B-1C, a plurality of docking stations 150 can be configured to hold the electronic devices in a generally vertical position. In some example charging stations (not depicted), the plurality of docking stations 150 can be configured to hold the electronic device in a generally horizontal orientation positioned on a shelf. The carts can be configured to hold as many electronic devices as desired. In some embodiments, the carts hold at least 10 electronic devices in their interior spaces. In other embodiments, the carts are configured to hold between 10 and 40 (e.g., 20 and 30) electronic devices in their interior spaces.

Figure 2:
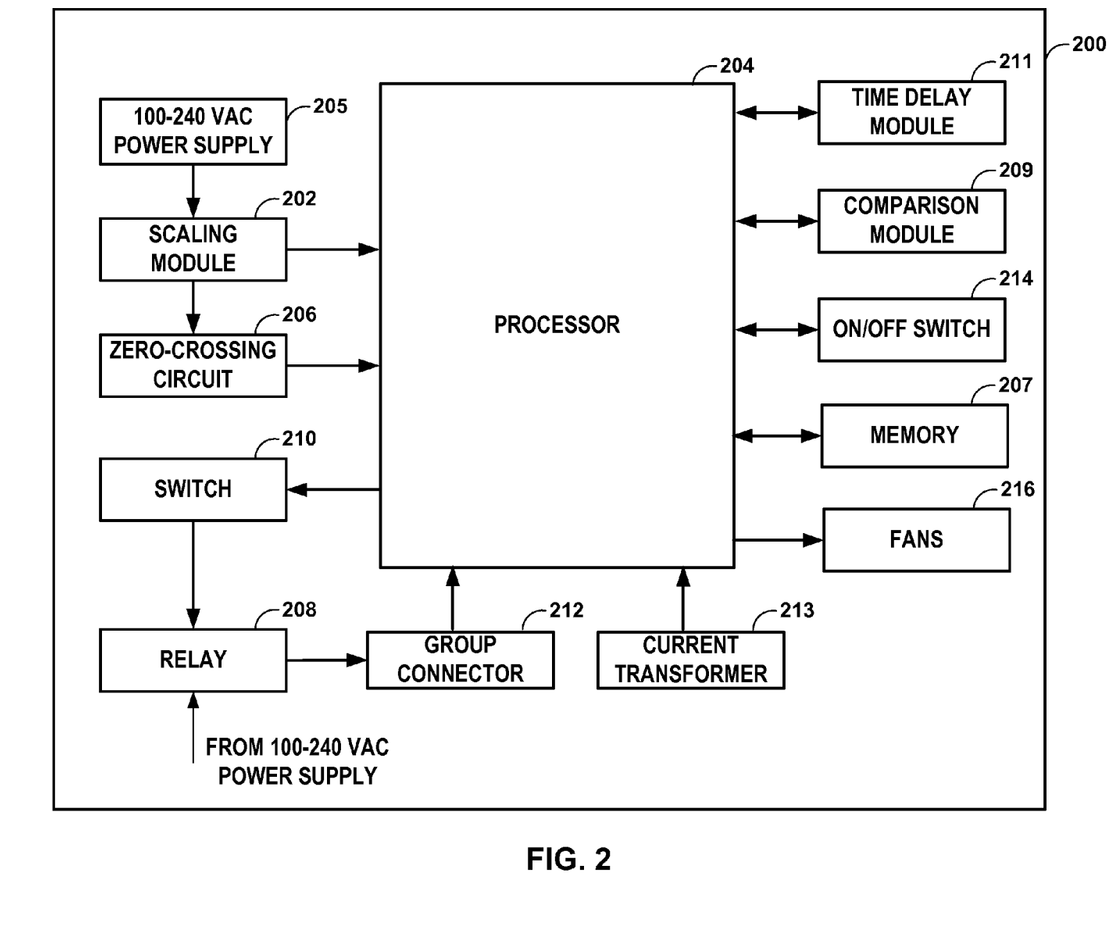
FIG. 2 is block diagram depicting an example of a battery charging system of a charging station that can implement various techniques of this disclosure.

FIG. 2 is block diagram depicting an example of a battery charging system 200 of a charging station, e.g., charging station 100 of FIGS. 1A-1D, that can implement various techniques of this disclosure. The charging system 200 can include a voltage scaling module 202 in communication with a processor 204. The scaling module can be configured to scale a first voltage, e.g., an input voltage, to a second voltage, e.g., an output voltage. In some examples, the scaling module 202 can include a voltage transformer. For example, a voltage transformer can include primary windings coupled to a mains line voltage 205 that supplies power to the charging station, e.g., 120-volt line voltage or a 230-volt line voltage, and second windings in communication with an input of the processor 204, e.g., an analog input. The ratio of the primary windings to the secondary windings of the voltage transformer, e.g., a turns ratio, can be used to scale the line voltage, e.g., 100-240 VAC to a second voltage. In some examples, the scaling module 202 can include an analog-to-digital (A/D) converter configured to convert the second voltage to a signal representing information about the second voltage to the processor 204, e.g., an average, a peak amplitude, a true root-mean-square value ("RMS"), and the like. This signal can be different if the charging station is connected to a primary voltage that is 120V versus 230V.

By way of specific example and for purposes of illustration only, if the ratio of the primary windings to the secondary windings of the voltage transformer was 60:1, the input signal at the processor 204 from the voltage transformer can be about 2V if the charging station is connected to a primary voltage that is 120V and about 4V if the charging station is connected to a primary voltage that is 230V.

In some examples, the A/D converter can be internal to the processor 204, rather than externally in the scaling module 202. The scaling module 202 can convert the voltage to DC, e.g., with two diodes, and can include a filter capacitor to give an average representation of AC with a DC voltage. The voltage that represents 230 VAC can be about 4V DC and the voltage that represents 120 VAC can be about 2V DC. This range of DC voltage levels can be desirable in order to reduce the voltage to a level that is less than the processor input limit. In some examples, the scaling module 202 can include a voltage divider after the filter capacitor to provide the input to an A/D converter.

As mentioned above, the scaling module 202 can include an A/D converter to generate and provide a digital representation of 2 or 4 volts, for example, to the processor 204. Alternatively, the scaling module can provide an analog voltage (e.g., 2 or 4 volts) to an input of the processor 204 that can be converted inside the processor 204 with a built-in A/D converter to a digital value (e.g., between 0 and 255).

The processor 204 can compare the digital representation of the input signal, e.g., a peak amplitude of the input signal, presented by the scaling module 202 to a value, e.g., stored in a memory device 207 of the system 200 using a comparison module 209. In some examples, the memory device 207 can be external to the processor 204. In other examples, the memory device 207 can internal to the processor 204. Using the comparison between the stored value and the input signal, the processor 204 can determine whether the input voltage is about 120 VAC or about 230 VAC and retrieve from the memory device 207 one or more charging parameter values. When indicated based on the comparison, the processor 204 can adjust one or more parameters of the control firmware accordingly. The charging parameter(s) that can be adjusted, e.g., altered in firmware, can include, but are not limited to, input charging current limits, threshold limits for individual groups of devices, time delay values for zero-crossing point measurements (discussed below), and/or other parameters that are regionally specific.

Continuing the specific example above for purposes of illustration only, the processor 204 can compare the input at the processor 204 from the scaling module 202, e.g., about 2V or about 4V, to the stored value, e.g., 3 V. The processor 204 can retrieve parameter values from the memory device 207 and, when indicated based on the comparison, adjust a charging parameter(s), e.g., an input charging current limit. For example, if the system 200 determined that the input voltage was 230 VAC, the processor 204 can, when indicated based on the comparison, retrieve a first input charging current limit from the memory device 207 and adjust (e.g., configure) the input charging current limit to be set to the first input charging current limit, and if the system 200 determined that the input voltage was 120 VAC, the processor 204 can, when indicated based on the comparison, adjust (e.g., configure) the input charging current limit to a second input charging current limit, e.g., higher than the first current limit. It should be noted that the processor 204 need not adjust any charging parameters based on the comparison because the parameters of the system 200 may already be properly configured.

In some examples, the system 200 can adjust a total input charging current limit parameter using the mains line voltage determination described above. As one example, for 120-volts, the system can adjust the total current limit to 12-amps and for 230-volt countries, the system can adjust the total current limit to 10-amps. The total current limit can, for example, be the absolute input current limit that the charging station can draw from the wall outlet, as measured by a current transformer 213, for example. If the system 200 determines, e.g., using the current transformer 213, that the current level exceeds the total current limit, the processor 204 can output a signal to the switch 210, e.g., to turn OFF the switch 210, which in turn can output a signal to the relay 208, e.g., to turn OFF the relay 208, to disconnect the 100-240 VAC power supply line voltage 205 to the group connector 212, thereby removing power to each electronic device's AC-DC converter connected to the group connector 212.

As another example, the system can adjust a maximum input charging current limit using the mains line voltage determination described above. As one example, for 120-volt countries, the system can adjust the maximum current limit to 10-amps and, for 230-volt countries, the system can adjust the maximum current limit to 8-amps. The maximum input charging current limit can be the current that allows the processor 204 to determine how many groups of electronic devices to form. The maximum input charging current limit can act as hysteresis, or a margin, that can allow for voltage fluctuations in the line voltage after the electronic devices have been grouped together for charging, thereby reducing the chance that a charge cycle can push the current over the total current limit and result in a shutdown or regrouping after the groups are formed.

In other example implementations, the scaling module 202 can include a voltage divider circuit, e g., resistive divider, to provide the input signal to determine the line voltage to which the cart is attached. The processor 204 can detect the voltage dropped by the voltage divider at an input, compare the detected voltage to a value using the comparison module 209, and automatically, e.g., without user intervention, adjust one or more charging parameters accordingly.

The present inventor has also recognized, among other things, that a problem to be solved can include limiting inrush current when the charging station is attached to the country-specific line voltage. The inrush current can be a result of the large capacitance of switch-mode power supplies commonly used by computing device manufacturers. If numerous electronic devices, e.g., 30 or more devices, are connected to the line voltage for charging at the same time, the power supplies of these devices can collectively have inrush currents on the order of many thousands of amps, depending on the current limiting provided by each device and the phase angle of the voltage at the charging station mains supply.

This disclosure provides a solution to the current limiting problem, such as by using the scaling module 202 to provide a voltage phase relationship to a zero-crossing detection circuit 206. Using the zero-cross information, the processor 204 can control when each electronic device's AC-DC converter switches on in order to reduce or minimize the inrush current.

As described above, the charging system 200 can include a scaling module 202, e.g., a voltage transformer or voltage divider. In some example configurations, the scaling module 202, e.g., a secondary winding of a voltage transformer, can be in communication with a zero-crossing circuit 206 that can detect a zero-cross point. A zero-cross point is where the amplitude of the voltage, e.g., the line voltage of 120V or 230V, is zero volts.

After the zero-crossing circuit 206 detects a zero-cross point, the zero-crossing circuit 206 can output a signal to an input of the processor 204, e.g., a digital input. However, by the time the processor 204 receives the signal from the zero-crossing circuit 206, it can be too late for the processor 204 to switch the electronic devices for charging to the mains line voltage without inrush current. Thus, a time delay can be introduced, e.g., a time delay that approximates the inverse of the frequency of the line voltage.

In an example implementation, a mechanical or solid-state device 208, e.g., a relay or switch, can be used to provide a time delay (which can be a characteristic of the device) after which the device 208, e.g., relay, can turn ON and connect the 100-240 VAC power supply line voltage 205 to a power receptacle group connector 212 connected to each docking station of the charging station, thereby providing power to each electronic device's AC-DC converter connected to the group connector 212.

In another example implementation, the processor 204 can provide a time delay to any device type, e.g., using a time delay parameter stored in memory. For example, using an input from the zero-crossing circuit 206, a time delay module 211 can determine a frequency of the line voltage, e.g., 50 Hz or 60 Hz. Using a time delay determined by the delay module 211, e.g., using the frequency of the line voltage or its inverse, the processor 204 can output a signal to switch 210 that is appropriately delayed. The electronic switch 210 can then turn ON and connect the 100-240 VAC power supply line voltage 205 to the group connector 212, thereby providing power to each electronic device's AC-DC converter connected to the group connector 212.

An example of a time delay is 8.3 milliseconds (ms), which is the time between zero-crosses of a 60 Hz mains voltage. Using a mechanical relay (or switch) 208 with an 8-ms time delay can result in a turn-on time that is approximately ½-cycle from when the initial zero-crossing is detected and signaled to the processor 204. When the relay 208 is turned ON, e.g., in response to a signal from the processor 204 to the switch 210, e.g., a MOSFET circuit, the AC-DC converters of the electronic devices to be charged can switch ON at the next zero-cross point, instead of the initial zero-cross point, due to the time delay introduced, e.g., from the processor 204 and the time delay module 211 or the relay 208. Regardless of the source of the time delay, the switching can occur at a voltage at or near 0 V, and therefore reduce or minimize the inrush current at turn-on.

This inrush current limiting technique can be repeated over and over again with the same results, in contrast to other techniques for inrush current limiting. For example, some techniques for inrush current limiting use temperature-type devices that have a high impedance (low current) when cold and have a low impedance (high current) when heated. However, after repeated on-off cycles, these temperature-type devices may not return to the high-impedance (cold) state. The inrush current limiting technique of this disclosure is not on-off cycle dependent.

In addition to the techniques described above, this disclosure is also directed to techniques for detecting the type and number of receptacles so that the firmware can adjust the turn-on or turn-off of the relays or switches on the circuit. In one example implementation, a configuration jumper (not depicted) can be included on a power receptacle group connector 212. If a certain number of power receptacles are installed, the configuration jumper can be in a position on the connector 212 that provides power to the receptacles from the relays or switches. If the connector 212 is present, the processor 204 can detect (or sense) the jumper and can add in the relays or switches to the firmware control. If the group of receptacles is not present, the processor 204 does not detect the configuration jumper and will not do anything with the control of the relays or switches for that group of receptacles since they are not present.

The present inventor have also recognized, among other things, that a problem to be solved can include providing safety-approved mains line-voltage switches to turn charging stations on or off. Because of the many world-wide voltages and national codes, it is expensive and difficult to find safety-approved mains line-voltage switches at maximum rated currents that are approved for world-wide operation of a charging station.

This disclosure provides a solution to the safety-approved mains line-voltage switch problem, such as by using a firmware technique in which a low-voltage, user controlled ON/OFF switch 214 is used to signal the processor 204. The processor 204 can determine the state of the switch 214 and output a signal that turns ON or OFF one or more relays and/or switches, e.g., switch 210 and relay 208 described above with respect to inrush current control and voltage detection. The relays and/or switches then turn ON or OFF to connect the 100-240 VAC power supply line voltage 205 to the group connector 212, thereby providing power to each electronic device's AC-DC converter connected to the group connector 212. The ON/OFF switch 214 is not directly connected to the 100-240V AC mains line-voltage and thus does not need to be rated for the maximum currents that are approved for world-wide operation of a charging station. The signal to the processor 204 from the ON/OFF switch 214 can also be used to control other devices, such as fans 216, peripheral components, or other indicators using MOSFETs or other devices appropriate to the levels needed.

Figure 3:
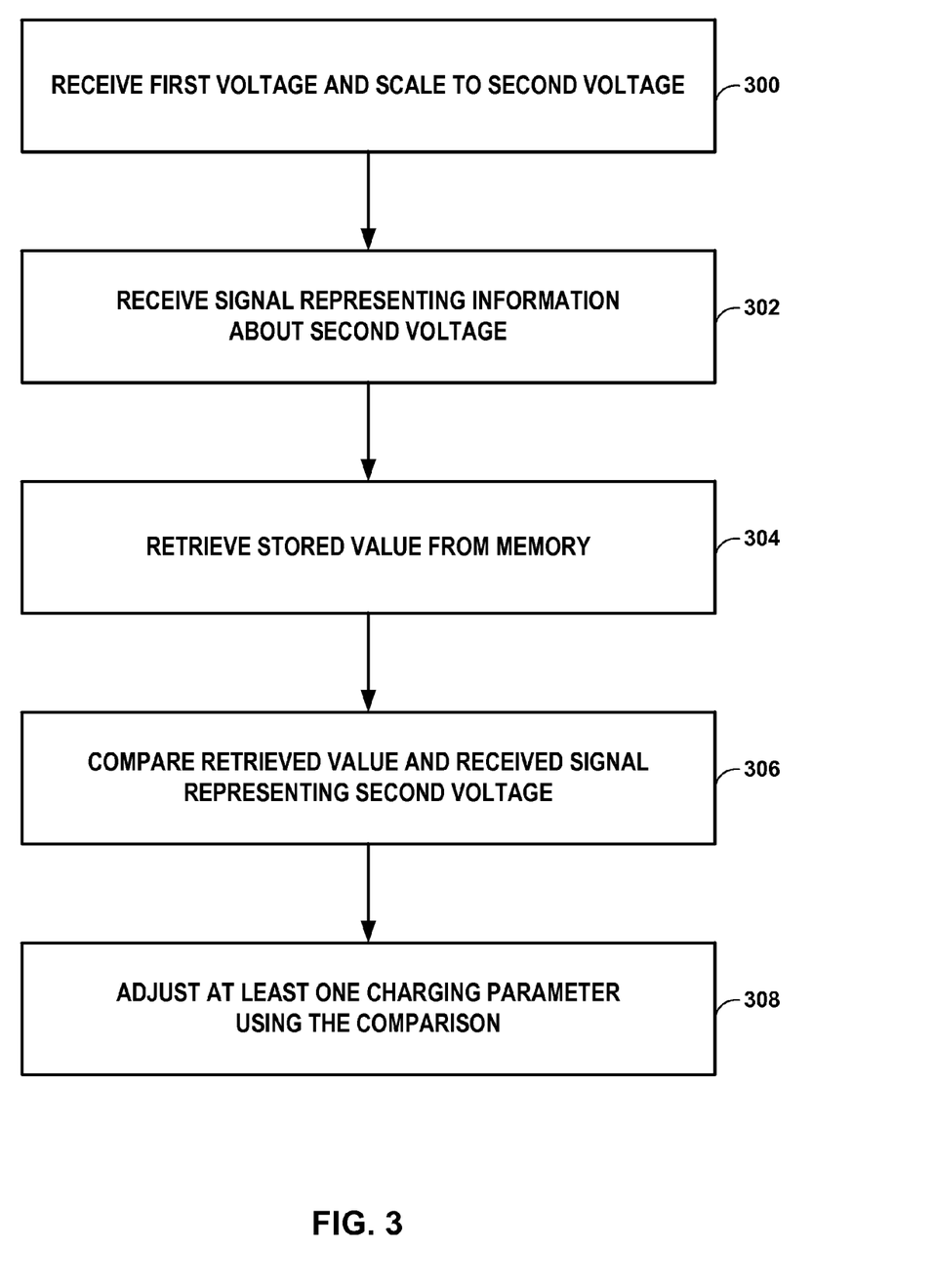
FIG. 3 is flow diagram of an example method of automatic charging parameter selection in a charging station, in accordance with this disclosure.

FIG. 3 is flow diagram illustrating an example method of implementing various techniques of this disclosure. In particular, FIG. 3 depicts an example method of charging parameter selection in a charging station, in accordance with this disclosure. In FIG. 3, a scaling module, e.g., scaling module 202, can receive a first voltage, e.g., a line voltage, and scale, e.g., reduce, the first voltage to a second voltage (block 300). After the scaling module scales the first voltage to the second voltage, a processor, e.g., processor 204, can receive a signal representing the second voltage, e.g., using an analog input (block 302). At block 304, the processor can retrieve a value stored in a memory, e.g., memory 207. The processor can then compare the retrieved value and the received signal, e.g., an amplitude of the second voltage (block 306). Using the comparison, the processor can adjust at least one parameter, e.g., a maximum inrush current limit (block 308).

Figure 4:
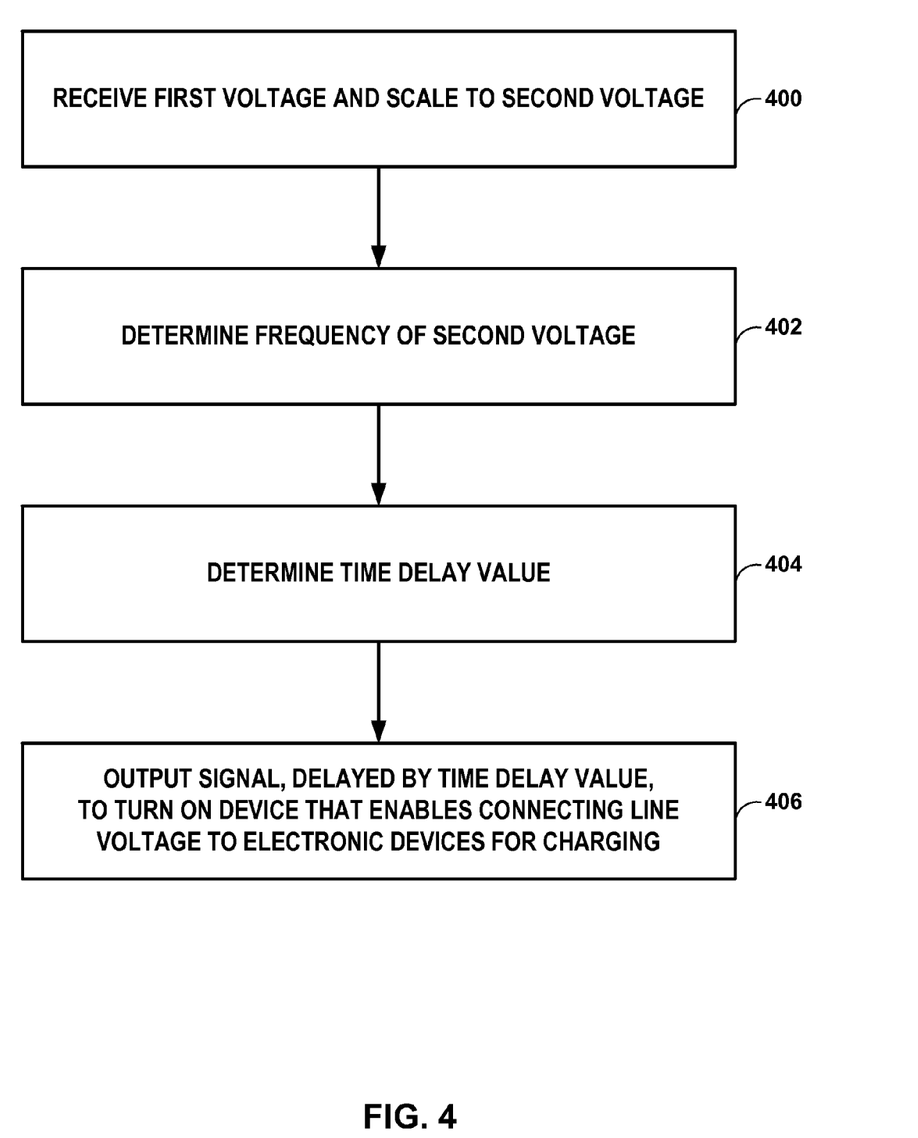
FIG. 4 is flow diagram of an example method of limiting inrush current in a charging station, in accordance with this disclosure.

FIG. 4 is flow diagram illustrating another example method of implementing various techniques of this disclosure. In particular, FIG. 4 depicts an example method of limiting inrush current in a charging station, in accordance with this disclosure. In FIG. 4, a scaling module, e.g., scaling module 202, can receive a first voltage, e.g., a line voltage, and scale, e.g., reduce, the first voltage to a second voltage (block 400). Using the scaled second voltage, the system 200 can determine a frequency of the second voltage (block 402). For example, using the scaled second voltage, a zero-crossing circuit, e.g., zero-crossing circuit 206, can detect at least two zero cross points and determine a frequency of the second voltage. As another example, after the scaling module 202 has determined the scaled second voltage, the processor 204 can compare a digital representation of the scaled second voltage to information stored in a lookup table, database, or other data structure stored in memory, e.g., memory device, and using the comparison, determine a frequency of the second voltage, e.g., where 120-volt detection is 60 Hz and 230-volt detection is 50 Hz.

After the zero-crossing circuit detects a zero-cross point, the zero-crossing circuit can output a signal to an input of a processor, e.g., a digital input of processor 204. The battery charging system, e.g., system 200, can determine a time delay value using the zero-crossing input information (block 404). For example, using an input from the zero-crossing circuit 206, a time delay module 211 can determine a frequency of the line voltage, e.g., 50 Hz or 60 Hz. Using a time delay determined by the delay module 211, e.g., using the frequency of the line voltage or its inverse, the processor 204 can output a signal to switch 210 that is appropriately delayed (block 406). The electronic switch 210 can then turn ON and connect the 100-240 VAC power supply line voltage 205 to the group connector 212, thereby providing power to each electronic device's AC-DC converter connected to the group connector 212.

Figure 5:
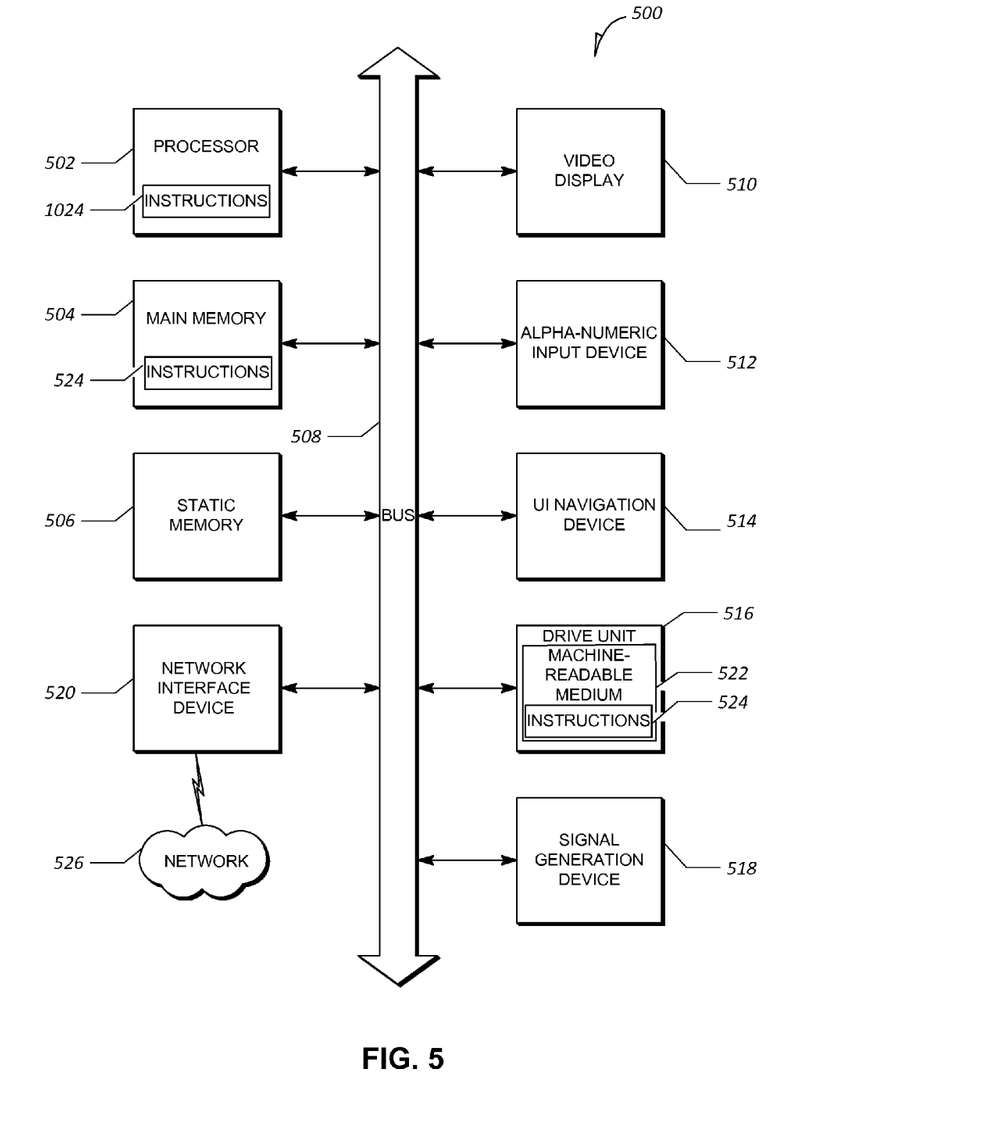
FIG. 5 is a block diagram of a machine in the example form of a computer system within which instructions may be executed for causing the machine to perform any one or more of the methodologies discussed in this disclosure.

FIG. 5 is a block diagram of a machine in the example form of a computer system 500 within which instructions 524 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Examples

Example 1 includes subject matter (such as a device, apparatus, or machine) comprising: a scaling module configured to receive a first voltage and scale the first voltage to a second voltage; a memory configured to store a value; and a processor configured to: receive a signal representing information about the second voltage; retrieve the stored value from the memory; and adjust at least one charging parameter when indicated based on a comparison between the retrieved value and the received signal representing the second voltage.

In Example 2, the subject matter of Example 1 may include, wherein the scaling module is a voltage transformer.

In Example 3, the subject matter of any one of Examples 1 to 2 may include, wherein the voltage transformer includes a turns ratio, and wherein the first voltage is scaled to the second voltage using the turns ratio.

In Example 4, the subject matter of any one of Examples 1 to 3 may include, wherein the scaling module is a voltage divider.

In Example 5, the subject matter of any one of Examples 1 to 4 may include, wherein the at least one charging parameter is an input charging current limit.

In Example 6, the subject matter of any one of Examples 1 to 5 may include, wherein the first voltage is mains line voltage.

Example 7 includes subject matter (such as a method, means for performing acts, machine readable medium including instructions that when performed by a machine cause the machine to performs acts, or an apparatus to perform) comprising: receiving a first voltage and scaling the first voltage to a second voltage; receiving a signal representing information about the second voltage; retrieving the stored value from the memory; comparing the retrieved value and the received signal representing the second voltage; and adjusting at least one charging parameter using the comparison.

In Example 8, the subject matter of Example 7 may include, wherein the at least one charging parameter is an input charging current limit. In Example 9, the subject matter of any one of Examples 7 to 8 may include, wherein the first voltage is mains line voltage.

Example 10 includes subject matter (such as a device, apparatus, or machine) comprising: a charging system comprising: a scaling module configured to receive a first voltage and scale the first voltage to a second voltage; a memory configured to store a value; and a processor configured to: receive a signal representing information about the second voltage; retrieve the stored value from the memory; and adjust at least one charging parameter using a comparison between the retrieved value and the received signal representing the second voltage.

In Example 11, the subject matter of Example 10 may include, wherein the scaling module is a voltage transformer.

In Example 12, the subject matter of any one of Examples 10 to 11 may include, wherein the voltage transformer includes a turns ratio, and wherein the first voltage is scaled to the second voltage using the turns ratio.

In Example 13, the subject matter of any one of Examples 10 to 12 may include, wherein the scaling module is a voltage divider.

In Example 14, the subject matter of any one of Examples 10 to 13 may include, wherein the at least one charging parameter is an input charging current limit.

In Example 15, the subject matter of any one of Examples 10 to 14 may include, wherein the first voltage is mains line voltage.

In Example 16, the subject matter of any one of Examples 10 to 15 may include, a charging cart.

In Example 17, the subject matter of any one of Examples 10 to 16 may include, a charging cabinet.

In Example 18, the subject matter of any one of Examples 10 to 17 may include, wherein the charging cabinet includes a desktop unit.

In Example 19, the subject matter of any one of Examples 10 to 18 may include, wherein the charging cabinet includes a wall-mount unit.

In Example 20, the subject matter of any one of Examples 10 to 19 may include, wherein the charging cabinet includes at least one locker.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like. Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

The invention claimed is:

1. A battery charging system for charging a plurality of portable electronic devices, the battery charging system comprising:
   a scaling module configured to receive a first voltage and scale the first voltage to a second voltage;
   a memory configured to store a value; and
   a processor configured to:
      receive a signal representing information about the second voltage;
      retrieve the value stored in the memory; and
      adjust at least one charging parameter when indicated based on a comparison between the retrieved value and the received signal representing the second voltage.

2. The battery charging system of claim 1, wherein the scaling module is a voltage transformer.

3. The battery charging system of claim 2, wherein the voltage transformer has a turns ratio, and wherein the first voltage is scaled to the second voltage using the turns ratio.

4. The battery charging system of claim 1, wherein the scaling module is a voltage divider.

5. The battery charging system of claim 1, wherein the at least one charging parameter is an input charging current limit.

6. The battery charging system of claim 1, wherein the first voltage is mains line voltage.

7. A computer implemented method of charging a plurality of portable electronic devices, the method comprising:
   receiving a first voltage and scaling the first voltage to a second voltage;
   storing a value in a memory;
   receiving a signal representing information about the second voltage;
   retrieving the value stored in a memory;
   comparing the retrieved value and the received signal representing the second voltage; and
   adjusting at least one charging parameter when indicated based on a comparison result of the comparing.

8. The method of claim 7, wherein the at least one charging parameter is an input charging current limit.

9. The method of claim 7, wherein the first voltage is mains line voltage.

10. A battery charging station for charging a plurality of portable electronic devices, the battery charging station comprising:
    a charging system including:
       a scaling module configured to receive a first voltage and scale the first voltage to a second voltage;
       a memory configured to store a value; and
       a processor configured to:
          receive a signal representing information about the second voltage;
          retrieve the value stored in the memory; and
          adjust at least one charging parameter when indicated based on a comparison between the retrieved value and the received signal representing the second voltage.

11. The battery charging station of claim 10, wherein the scaling module is a voltage transformer.

12. The battery charging station of claim 11, wherein the voltage transformer has a turns ratio, and wherein the first voltage is scaled to the second voltage using the turns ratio.

13. The battery charging station of claim 10, wherein the scaling module is a voltage divider.

14. The battery charging station of claim 10, the least one charging parameter is an input charging current limit.

15. The battery charging station of claim 10, wherein the first voltage is mains line voltage.

16. The battery charging station of claim 10, further comprising a charging cart.

17. The battery charging station of claim 10, further comprising a charging cabinet.

18. The battery charging station of claim 17, wherein the charging cabinet includes a desktop unit.

19. The battery charging station of claim 17, wherein the charging cabinet includes a wall-mount unit.

20. The battery charging station of claim 17, wherein the charging cabinet includes at least one locker.

\* \* \* \* \*

UNITED STATES PATENT AND TRADEMARK OFFICE
CERTIFICATE OF CORRECTION

PATENT NO. : 9,680,319 B2
APPLICATION NO. : 14/695846
DATED : June 13, 2017
INVENTOR(S) : William Dale Tischer It is certified that error appears in the above-identified patent and that said Letters Patent is hereby corrected as shown below:

In the Specification

In Column 8, Line 17, delete "100-240V AC" and insert --100-240 VAC-- therefor

In Column 10, Line 62, after "limit.", insert --¶--

In the Claims

In Column 15, Line 3, in Claim 14, delete "the" and insert --wherein the at-- therefor Signed and Sealed this
Tenth Day of April, 2018

Andrei Iancu
*Director of the United States Patent and Trademark Office*